United States Patent
Eberhardt et al.

(10) Patent No.: US 8,212,180 B2
(45) Date of Patent: Jul. 3, 2012

(54) METHOD FOR SEVERING BRITTLE FLAT MATERIALS BY LASER BEAM WITH PREVIOUSLY PRODUCED TRACES

(75) Inventors: Gabriele Eberhardt, Jena (DE); Hans-Ulrich Zuehlke, Jena (DE); Torsten Linke, Jena (DE)

(73) Assignee: Jenoptik Automatisierungstechnik GmbH, Jena (DE)

( * ) Notice: Subject to any disclaimer, the term of this patent is extended or adjusted under 35 U.S.C. 154(b) by 1184 days.

(21) Appl. No.: 11/997,852

(22) PCT Filed: Jul. 14, 2006

(86) PCT No.: PCT/DE2006/001243
§ 371 (c)(1),
(2), (4) Date: Feb. 4, 2008

(87) PCT Pub. No.: WO2007/016895
PCT Pub. Date: Feb. 15, 2007

(65) Prior Publication Data
US 2008/0217311 A1  Sep. 11, 2008

(30) Foreign Application Priority Data
Aug. 6, 2005  (DE) .......... 10 2005 038 027

(51) Int. Cl.
*B23K 26/00* (2006.01)
(52) U.S. Cl. .......... 219/121.72; 219/121.67; 219/121.84
(58) Field of Classification Search ............ 219/121.72, 219/121.67, 121.84, 121.68, 121.69
See application file for complete search history.

(56) References Cited

U.S. PATENT DOCUMENTS

| | | | |
|---|---|---|---|
| 3,935,419 A * | 1/1976 | Lambert et al. | 219/121.67 |
| 5,595,607 A * | 1/1997 | Wenham et al. | 136/244 |
| 5,614,445 A * | 3/1997 | Hirabayashi | 438/430 |
| 6,327,875 B1 * | 12/2001 | Allaire et al. | 65/103 |
| 6,423,930 B1 * | 7/2002 | Matsumoto | 219/121.69 |
| 6,653,210 B2 | 11/2003 | Choo et al. | |
| 6,664,503 B1 | 12/2003 | Hsieh et al. | |
| 6,800,831 B1 * | 10/2004 | Hoetzel | 219/121.72 |
| 6,812,430 B2 | 11/2004 | Kang et al. | |
| 7,169,688 B2 | 1/2007 | Liu | |
| 7,642,483 B2 * | 1/2010 | You et al. | 219/121.68 |
| 2004/0188400 A1 * | 9/2004 | Peng et al. | 219/121.72 |
| 2004/0228004 A1 | 11/2004 | Sercel et al. | |
| 2005/0153525 A1 | 7/2005 | Liu | |
| 2006/0021978 A1 * | 2/2006 | Alexeev et al. | 219/121.72 |

FOREIGN PATENT DOCUMENTS

| | | |
|---|---|---|
| JP | 5-32428 | 2/1993 |
| JP | 2001-151525 A | 6/2001 |
| JP | 2003-2676 A | 1/2003 |
| WO | 93/20015 | 10/1993 |

* cited by examiner

Primary Examiner — M. Alexandra Elve
(74) Attorney, Agent, or Firm — Duane Morris LLP

(57) ABSTRACT

The invention relates to a method for severing brittle flat materials, for example made of glass, ceramic, silicon, gallium arsenide or sapphire. The method includes the step of heating the flat material along desired dividing lines below its melting temperature by means of a laser alone desired separating lines. Then the material is shocked by a coolant jet so that a thermally-induced mechanical stress difference brings about a material separation. Traces are formed in the flat material in advance along the separation lines, so that the flat material has a lower breaking stress along the traces than in the unworked flat material, and the separation with the laser takes place along these traces.

2 Claims, 1 Drawing Sheet

METHOD FOR SEVERING BRITTLE FLAT MATERIALS BY LASER BEAM WITH PREVIOUSLY PRODUCED TRACES

RELATED APPLICATIONS

The present application is a U.S. National Stage application of international PCT application number PCT/DE2006/001243 filed on Jul. 14, 2006, which claims the benefit of German application number DE 10 2005 038 027.1 filed on Aug. 6, 2005, the contents of each of which are incorporated by reference in their entirety.

BACKGROUND

Severing brittle flat materials such as glass, sapphire, silicon, gallium arsenide or ceramics by producing a notch along the desired dividing line, along which breaking stresses are subsequently produced by subjection to mechanical forces, which leads to the complete separation of the flat material, is already known.

In order to sever the flat material in this way, the depth of the notch must be at least one-third of the flat material thickness. The notch can be applied mechanically or by means of lasers. Particularly for dicing chips from substrates (wafers), laser methods that create a notch by ablation into the material are increasingly being used. The notches are typically only a few μm wide and have an approximate depth of ⅓ the flat material thickness. The notch depth is produced proportionately to the total thickness of the flat material, depending on its brittleness. It is disadvantageous that every volume of removed material potentially contributes to the microscopic contamination of the material being processed. Since the aspect ratio between notch width and notch depth is critical to all these laser processes, complex apparatuses are needed and the notch is created relatively slowly. Deep notches for thick wafers therefore require increasingly more process time.

Such methods are disclosed in US 20050153525 or US 20040228004, for example, the contents of each of which are hereby incorporated by reference in their entirety. After production of the notches, the wafer is completely severed by applying mechanical (impulse) energy or forces, for example tensile force (stretching of films), bending forces (breaking over ridges) or a combination thereof.

Mechanical application of breaking forces is geometrically relatively imprecise. Therefore fracture flaws can occur if the breakage lines do not run perpendicular to the material thickness or if two breakage lines intersecting at one point do not meet one another at the intended angle. Particularly in chip production, such breaking faults lead to a reduction of yield and must therefore be avoided. In addition, material particles split off, which can entail a macroscopic contamination of the surface of the flat material.

Instead of severing a flat material by material removal, e.g., in form of a notch as described, a known method is to produce a mechanically-induced initial crack, which is subsequently propagated through the flat material by means of thermally-induced mechanical stresses. Such a method (thermal laser separation—TLS) is described in WO 93/20015 the contents of which is hereby incorporated by reference in its entirety. It is disadvantageous particularly if a flat material separated into several parallel strips is to be severed in a second direction, for example, orthogonally to the first separation direction, for example, into individual rectangles in the dicing of a wafer into individual chips. Since a new initial crack must be made at the beginning of each dividing line in the first separation direction, the process is very time-consuming and the mechanical scoring system is subject to high wear.

The problem, which is solved by the present invention is to find a method with which brittle flat materials can be separated into a plurality of single components, in particular, with which wafers can be diced into chips, with good time efficiency and high edge quality.

This problem is solved by a method according to claim 1. Advantageous embodiments are described in the dependent claims.

BRIEF DESCRIPTION OF THE DRAWINGS

One exemplary embodiment will be described on the basis of the drawings, in which.

DETAILED DESCRIPTION OF EMBODIMENTS

The invention will be described below for the dicing of a wafer as an example of the invention, but is not limited thereto, but rather is applicable to severing any brittle flat material.

Figure 1:
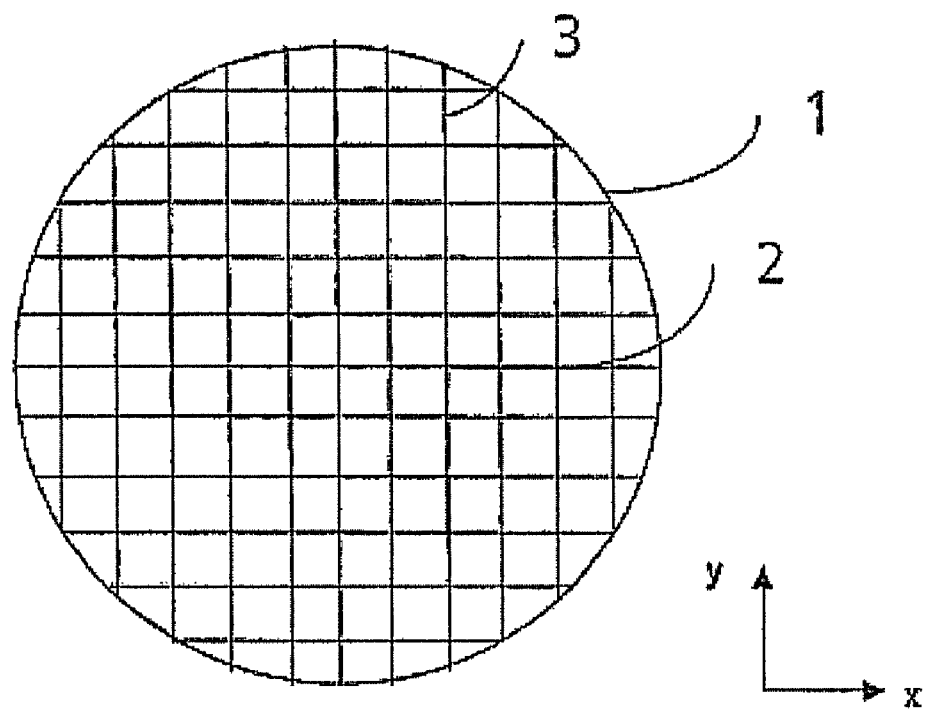
FIG. 1 illustrates a wafer in plan view.

The intended dividing lines, consisting of a plurality of x-dividing lines 2 (dividing lines running in the X-direction) and a plurality of y-dividing lines 3 (dividing lines running in the Y-direction), are shown in wafer 1 illustrated in FIG. 1. For dicing the wafer (a sapphire wafer in the present case), traces are first produced along the x-dividing lines 2 and then along the y-dividing lines 3. According to the invention, the traces can be produced either by material removal or by material modification of the flat material. In both cases, the critical breaking stress of the material is lowered along the traces in comparison to the unprocessed material. In the case of material removal, the thickness of the material to be separated is additionally reduced according to the notch depth.

The method is also applicable if the stress conditions in the flat material vary along the dividing line or if the material thickness varies. So that the separation cracks always lead reliably to material separation independently of such local differences in the material, the notches or material modifications can be locally varied in geometry and, particularly in depth, over the dividing line.

The traces can be produced directly before the actual separation process, or before or between other treatment processes on the wafer.

Figure 2:
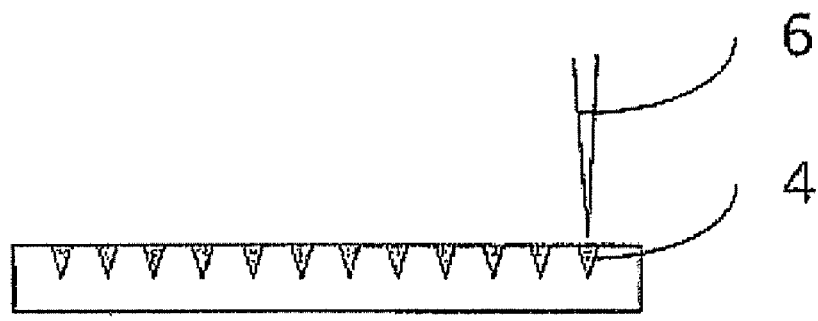
FIG. 2 shows the wafer according to FIG. 1 in side view after production of the traces, notches in this case.
Figure 3:
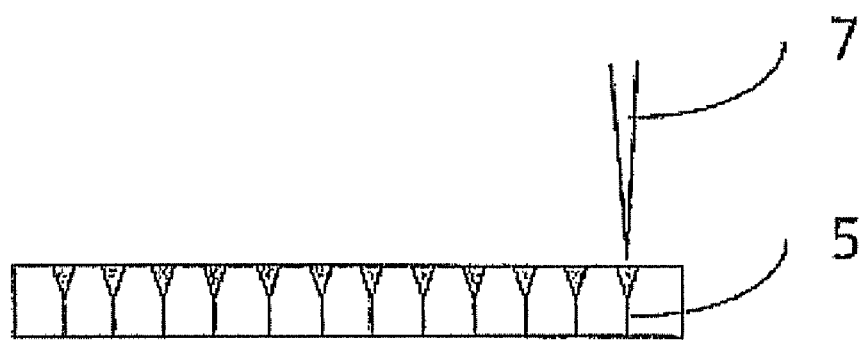
FIG. 3 shows a wafer according to FIG. 1 in side view after production of the separation cracks.

In a first embodiment, the traces are produced by material removal by means of a first laser radiation or beam 6 (FIG. 2). For this, the laser radiation 6, from a UV laser, for instance, directed at the upper side of wafer 1 is guided in the respective separation direction. The developing notches 4 have a width of 2-5 μm and a depth of 3-10 μm. The cutting velocity lies in the range of 50-70 mm/s. With a chip size of 320×320 μm², there are approximately 300 such dividing lines, 150 x-dividing lines and 150 y-dividing lines on a 2" wafer. The depth of the notches according to the present invention can be selected clearly smaller than in the methods according to the prior art, e.g., less than 1/10 of the material thickness. In comparison to mechanical scoring, as proposed in WO 93/20015 (the contents of which is hereby incorporated by reference in its entirety) with the TLS method, the speed of this method is clearly higher. After the production of all notches 4 along the x and y separating lines, thermally-induced mechanical stress differences are produced in notches 4, starting from the vertices of the notches, which causes the flat material to split into separation cracks 5. This stress difference is induced by guiding a second laser radiation 7, e.g., that of a $CO_2$ laser, along notches 4 (FIG. 3) (thermally-induced compression stress), followed by a coolant jet, with a water/air mixture (aerosol) for example, or a cooled gas (thermally induced tensile stress). This process takes place at a velocity of 300-400 mm/s relative to the material.

The selection of the lasers for the first and second laser radiation 6 and 7, as well as their process parameters, is material-dependent. While the laser for the first laser radiation 6 and the processing parameters in effect for it (in particular, laser power, pulse duty ratio and the speed of the relative motion) are selected in such a way that the material within the impacted area is removed and driven out by, for example, melting or vaporization, the laser for the second laser radiation 7 and the processing parameters in effect for it are selected in such a way that the material is warmed up only below all critical destruction thresholds. Different lasers or a single laser can be used. The differing heating can be effected by using lasers with different wavelengths which are absorbed differently by the material, or by modulating the temporal or spatial energy distribution, for example by modifying the beam geometry, the radiation intensity distribution in the irradiation spot or by a variation of laser power or pulse duty. In comparison to known methods, in which a notch is produced by means of lasers and the material is then fractured mechanically, the thermal load is kept substantially smaller, because notches 4 are kept more shallow and less volume erosion takes place if the separation crack is subsequently produced by thermally induced mechanical stresses. Furthermore, the developing separation edges are smoother and fracture flaws are minimized. The drastically reduced notch depth results in a markedly reduced particle release. Notching with the laser is particularly advantageous whenever the notch cannot be produced in other production steps with available means.

In a second embodiment, the traces should be notches that are produced by an etching technique, as is customary in front-end processes in the semiconductor industry, for example by wet-chemical etching or plasma etching. Because again only a minimum notch depth of few µm is necessary in preparation for the TLS process, there is no danger of premature destruction of the wafer in the handling and process steps. The geometry of notches 4 differs from those produced by laser 6 in that they have substantially steeper notch flanks and a broader notch trough. For a desired notch depth of 5-10 µm, the width of the notch is 2-3.5 µm. The flat material with notches produced in such a manner is then fractured with laser 7 analogously to the first embodiment.

In principle, the manner in which the notch is prepared is not crucial, but rather the fact that such a notch is created along a dividing line in order to drive a crack outgoing from the troughs of the notches. A third embodiment differs from the embodiments described up to this point in that the trace is produced not by material removal in the form of a notch 4, but by material modification along the dividing line. Thus, the material structure can be changed by energy input or doped by ion implantation to deliberately modify the material characteristics locally in such a way that the critical breaking stress along the trace is reduced.

The present invention is not to be limited in scope by the specific embodiments disclosed in the examples which are intended as illustrations of a few aspects of the invention and any embodiments that are functionally equivalent are within the scope of this invention. Indeed, various modifications of the invention in addition to those shown and described herein will become apparent to those skilled in the art and are intended to fall within the scope of the appended claims.

If not already noted hereinabove, the contents of each reference cited herein are hereby incorporated by reference in their entirety.

The invention claimed is:

1. A method for severing a brittle flat material, comprising heating said flat material along dividing lines below the fusing temperature by means of lasers, said dividing lines thereby having only length and width characteristics, subsequently shocking said material by a coolant jet so that a thermally-induced mechanical stress difference effects a material separation, wherein traces having length, width and depth characteristics, are previously produced in the flat material along the dividing lines so that the flat material has a smaller breaking stress along the traces than in the unprocessed material wherein said traces are produced by a material modification, whereby the material structure of the material is changed by the addition of a depth component to said dividing lines, said depth being less than one-tenth the thickness of said flat material, and no less than 3 µm, and the critical breaking stress is reduced along the traces, and wherein the separation with the laser takes place along said traces.

2. The method according to claim 1, wherein said trace has a geometry and said geometry of said trace is varied locally along the dividing line in order to compensate for differences of stress and material thickness in the flat material along the dividing line.

* * * * *